United States Patent
Bahree et al.

(10) Patent No.: US 10,102,774 B2
(45) Date of Patent: Oct. 16, 2018

(54) SYSTEMS AND METHODS FOR ORGANIZING AND PRESENTING SKILL PROGRESSIONS

(71) Applicant: Avanade Holdings LLC, Seattle, WA (US)

(72) Inventors: Amit Bahree, Basingstoke (GB); Raghavan Tinniyam Iyer, Bangalore (IN); Ramkumar Kothandaraman, Bangalore (IN); Murli Krishnan Iyer, Maharashtra (IN)

(73) Assignee: Avanade Holdings LLC, New York, NY (US)

( * ) Notice: Subject to any disclaimer, the term of this patent is extended or adjusted under 35 U.S.C. 154(b) by 1042 days.

(21) Appl. No.: 14/275,651

(22) Filed: May 12, 2014

(65) Prior Publication Data
US 2014/0335501 A1  Nov. 13, 2014

Related U.S. Application Data

(60) Provisional application No. 61/822,275, filed on May 10, 2013.

(51) Int. Cl.
*G09B 5/02* (2006.01)
*G09B 19/18* (2006.01)
*G09B 19/00* (2006.01)

(52) U.S. Cl.
CPC ............. *G09B 19/18* (2013.01); *G09B 19/00* (2013.01)

(58) Field of Classification Search
CPC .......... G06Q 10/06; G06Q 10/063112; G06Q 10/06398; G06Q 10/0639; G06Q 10/06393; G06Q 10/063; G06Q 50/20; G06Q 50/205; G09B 19/00; G09B 29/00; G06F 17/30539; G06F 17/30702; G06N 5/00; G06N 5/02
See application file for complete search history.

(56) References Cited

U.S. PATENT DOCUMENTS

| | | | |
|---|---|---|---|
| 2002/0055870 A1* | 5/2002 | Thomas | G06Q 10/06 705/7.14 |
| 2004/0115596 A1* | 6/2004 | Snyder | G09B 7/02 434/118 |
| 2011/0276694 A1* | 11/2011 | Swenka | H04L 41/0893 709/226 |
| 2014/0279629 A1* | 9/2014 | McConnell | G06Q 10/0639 705/320 |

* cited by examiner

*Primary Examiner* — Nathan Hillery
(74) *Attorney, Agent, or Firm* — Christensen O'Connor Johnson Kindness PLLC

(57) ABSTRACT

Systems, methods, and devices for presenting and managing interrelated sets of skills are provided. In some embodiments, a map interface is provided that presents the interrelated skills to a user, and provides the user an opportunity to strategize regarding how best the skills may be acquired to advance on a career path. In some embodiments, an administrative user may use the interface to view an aggregate skill set of employees in an organization.

6 Claims, 7 Drawing Sheets

SYSTEMS AND METHODS FOR ORGANIZING AND PRESENTING SKILL PROGRESSIONS

CROSS-REFERENCE TO RELATED APPLICATION

This application claims the benefit of U.S. Provisional Application No. 61/822,275, filed May 10, 2013, the entire disclosure of which is hereby incorporated by reference herein.

BACKGROUND

In any organization, the skills collectively possessed by individuals of the organization can determine the capabilities of the organization as a whole. Previously, there was no centralized method or system for managing skills which are complex and wide-ranging. There was also no effective way for individuals to review skills they possess and to discover other skills which they can cross-train and leverage—either to enhance their existing roles and responsibilities, or possibly change skills and get involved with another area and thereby grow their career. The limited visualizations of skill sets offered to the individuals were static and non-interactive, which is not ideal.

When organizations grow and begin hiring new technical employees, this tremendous influx of new resources and talent makes the overall skill set of the organization increasingly difficult to comprehend. The challenge gets increasingly difficult over time. Further, to allow such companies to both retain and attract talent such companies want to ensure that they can provide a clear path for employees to manage their careers and talent growth effectively. Such companies are also challenged to be able to efficiently allocate technical resources, and to visualize technical areas in which their current employees are strong, and areas in which their current employees need further training (or new employees need to be recruited) to help the company compete in the marketplace.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a skill management system is provided comprising at least one computing device configured to provide a skill tree data store and at least one computing device configured to provide an interface engine. The skill tree data store is configured to store a set of technologies, and each technology of the set of technologies includes a corresponding set of skills. The interface engine is configured to generate an interface that includes a skill map. The skill map illustrates the set of technologies along with the corresponding skills, and includes indications illustrating which skills are shared by more than one technology.

In some embodiments, a computer-implemented method for presenting information relating to skills and technologies is provided. A computing device retrieves a set of technologies from a skill tree data store, wherein each technology of the set of technologies includes at least one skill. The computing device adds a line to a map layout for each technology of the set of technologies. The computing device determines a subset of technologies of the set of technologies, wherein each technology of the subset of technologies includes a common skill. The computing device adds a link to the map layout that connects each technology of the subset of technologies and indicates the common skill. The computing device adds an indication on each line for each skill of the technology associated with the line other than the common skill.

In some embodiments, a nontransitory computer-readable medium is provided having computer-executable instructions stored thereon that, in response to execution by one or more processors of at least one computing device, cause the at least one computing device to perform actions for managing information relating to skills and technologies. The actions comprise retrieving, by the at least one computing device, a set of technologies from a skill tree data store, wherein each technology of the set of technologies includes at least one skill; adding, by the at least one computing device, a line to a map layout for each technology of the set of technologies; determining, by the at least one computing device, a subset of technologies of the set of technologies, wherein each technology of the subset of technologies includes a common skill; adding, by the at least one computing device, a link to the map layout that connects each technology of the subset of technologies and indicates the common skill; and adding, by the at least one computing device, an indication on each line for each skill of the technology associated with the line other than the common skill.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
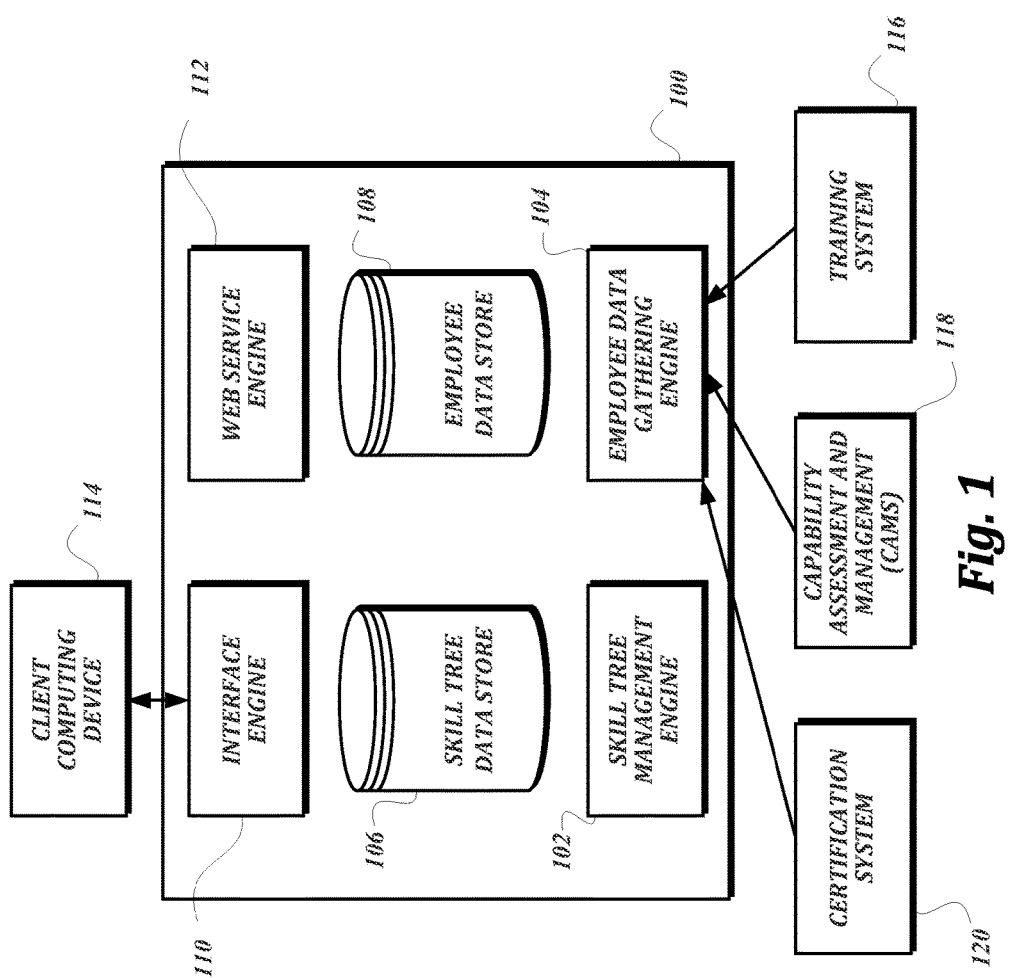
FIG. 1 is a block diagram that illustrates an exemplary skill management system according to various aspects of the present disclosure.

The convergence of Tech Trends (specifically Mobility, Big Data, and Cloud) helps the creation of modern skills management systems. The solutions described herein to the problems discussed above have wide applicability across industry domains, industry sectors, and vertical industry segments, as the problems are extremely common.

In some embodiments, the present disclosure provides "skill management as a service," which allows companies to help manage the various skills they need to track for their employees. Embodiments of the present disclosure may tailor views and flows to be user specific and make such views and flows personal and relevant to the user. For human resources professionals, trainers, financial analysts, and/or the like, embodiments of the present disclosure allow skills to be managed across multiple industry domains, and to be categorized in various groups for easy management and tracking. Some embodiments of the present disclosure may also provide a web portal, via which the skills and relevant data can be very easily managed and published in real-time. An employee, after logging in, may be presented a highly personalized view outlining their current primary skills, their technology areas, the training they have completed, current certification statuses, and/or other skill-related information.

This solution solves problems in a few ways and provides options for the individual which were not possible earlier. One nonlimiting example of a way in which some embodiments of the present disclosure address the problems is through visualization. The information and details are visual, detailed and up to date, and 'alive' which allows an individual to see where exactly they stand. The user will be presented relevant details about their primary and secondary skills, and also other skills which may be directly or indirectly related to those skills. This can help a user easily review all the details in a visual manner and hence help in developing an understanding of their skill set and how it can be improved.

Another nonlimiting example of a way in which some embodiments of the present disclosure address the problems is by providing easy exploration via skill trees. All different skills are tagged, mapped, and detailed out visually. Such a map-based interface can allow an individual to navigate from their current skill and explore other skills which might be of interest.

Yet another nonlimiting example of a way in which some embodiments of the present disclosure address the problems is by providing a 360 degree view of skills. For each skill, the interface presented may allow an individual to visualize other interdependent skills which may be a prerequisite or may be helpful for further enhancing their careers. An individual may also be presented with details related to the skills such as available trainings, related books, certifications, etc. which gives them a full 360 degree view of those skills and allows them to plan and execute their career goals and aspirations.

Still another nonlimiting example of a way in which some embodiments of the present disclosure address the problems is by providing cloud-based syndication. In some embodiments, cloud-based services are provided which allow a user to be using any platform and still use the solution—be it on a desktop computing device, a mobile computing device, or any other computing device. In some embodiments, the solution may be 'white labeled' which allows changes to the look, feel, and branding of the solution to be integrated into third-party product offerings. In some embodiments, the solution may also be multi-tenant and can be run either on premise, private cloud, or public cloud.

One more nonlimiting example of a way in which some embodiments of the present disclosure address the problems is by providing agile skills management. In some embodiments, the solution supports management of skills in an agile manner by ensuring that all relevant details are metadata or parameter driven and nothing relating to specific skills or technologies is hard wired into the solution. When skills change and evolve, embodiments of the present disclosure can be updated to manage and present the changed skills with relative ease and almost instantaneously. The solution may also include a management portal which allows authorized users to administer the various skills, their details, their interdependencies, and how they are presented in a map layout.

FIG. 1 is a block diagram that illustrates an exemplary skill management system according to various aspects of the present disclosure. As illustrated, the skill management system 100 includes an interface engine 110, a web service engine 112, a skill tree management engine 102, and an employee data gathering engine 104. In general, the word "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Engine functionality may be callable from other engines or from themselves. Generally, the engines described herein refer to logical modules that can be merged with other engines, or can be divided into sub-engines. The engines can be stored in any type of computer-readable medium or computer storage device and can be stored on and executed by one or more general purpose computers, thus creating a special purpose computer configured to provide the engine.

As stated above, the skill management system 100 includes a skill tree management engine 102. In some embodiments, the skill tree management engine 102 is configured to manage information relating to a plurality of skills. In its broadest sense, a skill is a talent, a body of knowledge, or another relevant characteristic possessed by an individual. As one non-limiting example, knowledge of a particular programming language or software platform may be considered a "skill." As another non-limiting example, an ability to effectively communicate with customers may be considered a "skill." Management of skills may include tasks such as organizing skills into groups. In some embodiments, skills may be assigned to one or more technologies. Generally, a "technology" is a grouping of skills. One nonlimiting example of a technology is a complex software platform for which comprehensive knowledge requires multiple separate skills. Another nonlimiting example of a technology is a talent area such as end-user support. Other non-limiting examples of skills and technologies are provided in FIGS. 2A and 2B. In some embodiments, the skill tree management engine 102 is configured to assign skills to technologies, to determine links between technologies, to manage map layouts that depict technologies and skills, and to perform other relevant management tasks.

The employee data gathering engine 104 of the skill management system 100 collects employee skill data from one or more sources. In some embodiments, the employee data gathering engine 104 may receive information regarding employees and the skills possessed by each employee via user input. In some embodiments, the employee data gathering engine 104 may query other data sources for employee skill data. For example, certification systems 120, capability assessment and management systems (CAMS) 118, training systems 116, and/or the like may be used as data sources by the employee data gathering engine 104. These backend systems may be controlled by the party operating the skill management system 100, or may be controlled by one or more third parties.

The interface engine 110 is configured to provide access to various functionality provided by the skill management system 100. In some embodiments, the interface engine 110 may generate an interactive web interface to be presented to a user by a client computing device 114. The interface engine 110 may also receive input from the client computing device 114 to modify data stored by the skill management system 100 or to reformat representations thereof. The web service engine 112 is configured to provide functionality similar to that provided by the interface engine 110, but does so in a machine-accessible format (as opposed to a human-accessible format), such as a SOAP interface or any other suitable machine-accessible interface.

As illustrated, the skill management system 100 also includes a skill tree data store 106 and an employee data store 108. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed packet switched network. However, any other suitable storage technique and/or device capable of quickly and reliably providing the stored data in response to queries may be used, and the computing device may be accessible locally instead of over a network, or may be accessible over some other type of suitable network or provided as a cloud-based service. A data store may also include data stored in an organized manner on a storage medium 508, as described further below. One of ordinary skill in the art will recognize that separate data stores described herein may be combined into a single data store, and/or a single data store described herein may be separated into multiple data stores, without departing from the scope of the present disclosure.

As stated above, the illustrated skill management system 100 includes a skill tree data store 106 and an employee data store 108. In some embodiments, the skill tree data store 106 is configured to store information that defines skills, technologies, their relationships, and/or the like as managed by the skill tree management engine 102 in any suitable format. The information may include, but is not limited to, a name of a skill and one or more ways to prove that the skill is possessed by an individual (e.g., an associated certification, a survey question, a test question, and/or the like).

In some embodiments, the employee data store 108 is configured to store information regarding employees, such as names, employee identifiers, skills held by individual employees, and/or the like as managed by the employee data gathering engine 104 in any suitable format. Further description of the management of the data stored in the skill tree data store 106 and the employee data store 108 is provided below.

Figure 2A:
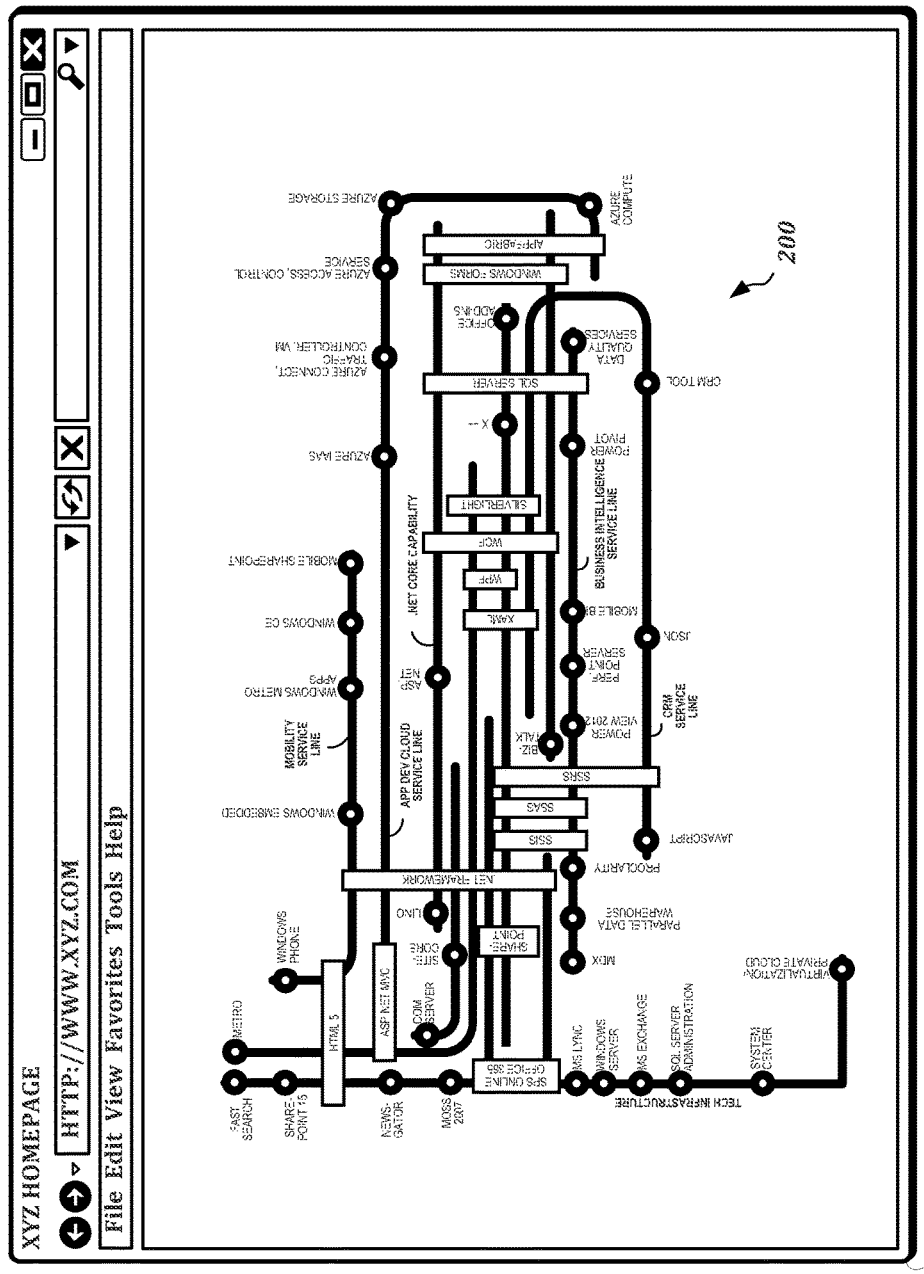
FIG. 2A illustrates an overview of an exemplary embodiment of an interface generated according to various aspects of the present disclosure.
Figure 2B:
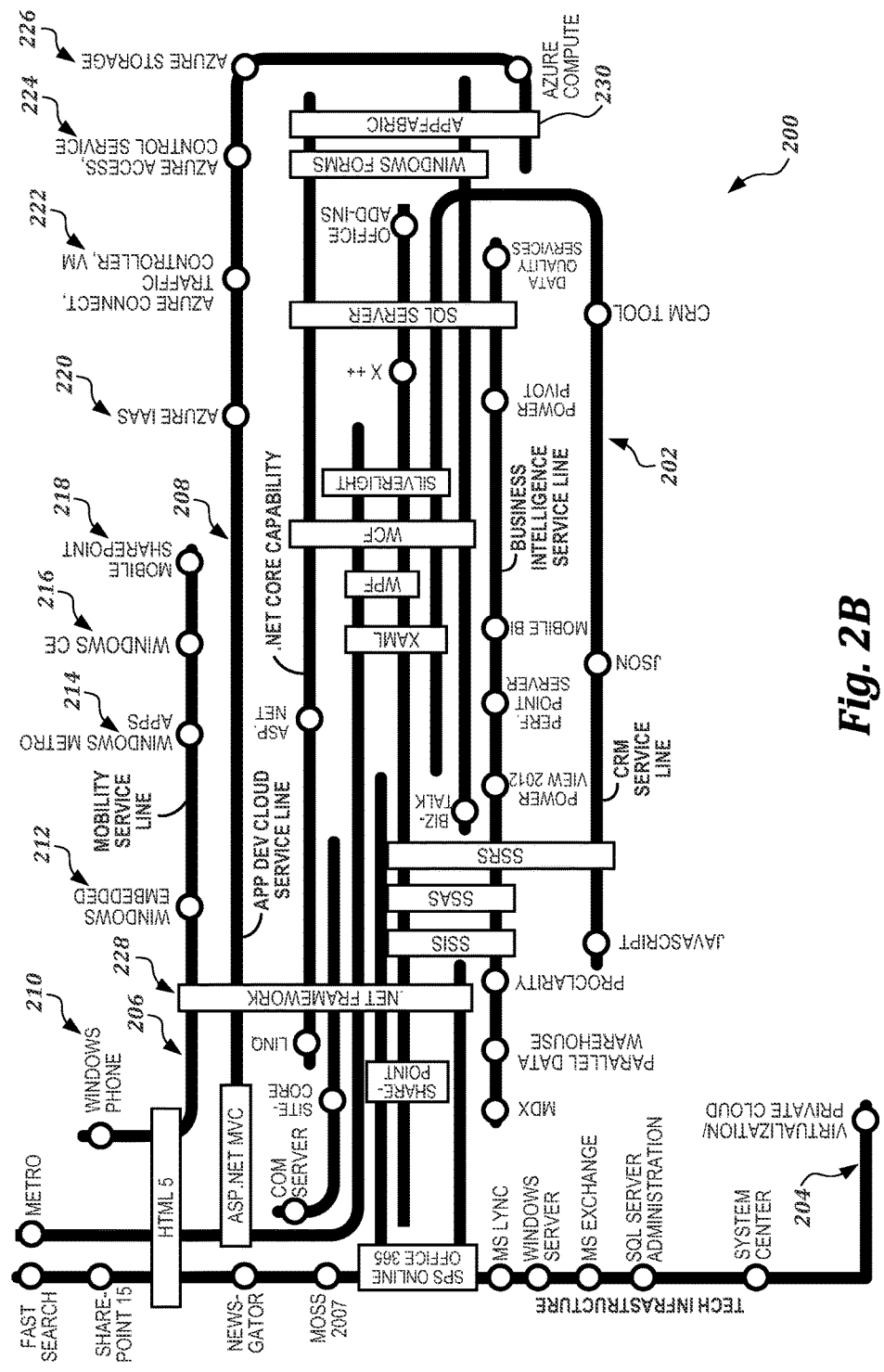
FIG. 2B is a detail view that illustrates details of the interface illustrated in FIG. 2A.

FIG. 2A illustrates an overview of an exemplary embodiment of an interface 200 generated according to various aspects of the present disclosure, and FIG. 2B is a detail view that illustrates details of the interface 200 illustrated in FIG. 2A. FIG. 2A illustrates a typical embodiment, in which the interface engine 110 has generated a web-based interface 200 for presentation on a client computing device 114 by a standard web browser 90. In other embodiments, the interface 200 may be presented by a stand-alone application executing on the client computing device 114 upon retrieving data from the skill management system 100 via the web service engine 112. One of ordinary skill in the art will recognize that the description of the interface 200 as illustrated in FIGS. 2A and 2B is applicable to any embodiment of the interface 200, no matter how it is presented by the client computing device 114.

The illustrated embodiment presents a solution to manage complex, and wide-ranging skills related to Microsoft technologies and provide an intuitive guide for a long term career path, enabled via multiple skills. That said, Microsoft technologies are discussed herein for ease of discussion only. Embodiments of the present disclosure are not limited to use with Microsoft technologies, and any set of interrelated skills may be presented and managed using embodiments of the skill management system 100 described herein.

In the embodiment illustrated in FIGS. 2A and 2B, the interface 200 presents a plurality of skills in a layout reminiscent of a transit map. Such a presentation allows relations between the plurality of skills to be easily observed (including which skills are applicable to more than one technology), and for plans to be made regarding how to efficiently train to become proficient in new skills.

In the interface 200, a plurality of "lines" is presented, each line being associated with a technology. The illustrated technology lines include a CRM service line 202, a technology infrastructure line 204, a mobility service line 206, and a cloud line 208. Other lines are also illustrated, but are not labeled or described further herein for brevity. Each technology "line" includes one or more "stops" to provide indications of skills associated with the technology. For example, the mobility service line 206 includes a Windows Phone stop 210, a Windows Embedded stop 212, a Windows Metro Apps stop 214, a Windows CE stop 216, and a Mobile SharePoint stop 218. As another example, the cloud line 208 includes an Azure Infrastructure as a Service (IaaS) stop 220, an Azure Connect, Traffic Controller, and Virtual Machine (VM) stop 222, an Azure Access Control Service stop 224, an Azure Storage stop 226, and so on. Other stops that indicate skills associated with the various technology lines are also illustrated, but are not labeled or described further herein for brevity.

In some embodiments, the inclusion of a given stop on a given line indicates that a skill associated with the stop is relevant to a technology associated with the line. For example, the stops on the mobility service line 206 indicate that skills related to Windows Phone, Windows Embedded, Windows Metro Apps, Windows CE, and Mobile SharePoint are relevant to Mobility Services. By consulting the map, one could determine that building proficiency in one or more of the skills indicated by the stops would raise an overall proficiency in the technology related to the line.

In some embodiments, the interface 200 may also include indications similar to transfer stations that link together two or more technology lines, such as a .NET Framework transfer station 228 and an AppFabric transfer station 230. The transfer stations presented by the interface 200 indicate skills that are applicable to more than one technology, and therefore can help a person obtain skills relating to a new technology based on a technology with which the person is already proficient. For example, a person may be proficient in several skills or technologies associated with the mobility service line 206, such as Windows Embedded 212 or Windows Metro Apps 214. The .NET Framework transfer station 228 indicates that by having proficiency in the .NET Framework, the person could leverage their experience and knowledge in the mobility service line 206 to gain skills in other lines, such as the cloud service line 208. Likewise, the AppFabric transfer station 230 indicates that by having proficiency in the AppFabric technology, a person who has skills in the cloud line 208 may be able to easily transition to learn skills related to the application development integration service line 232.

The use of lines, stops, and transfer stations may provide users the ability to strategically plan progress toward career development goals. For example, by viewing the interface 200, a user can determine that the .NET Framework transfer station 228 connects a large number of different lines, and therefore would be a valuable skill to obtain to maximize career flexibility. Likewise, if a user is interested in developing talents related to mobility services and an opportunity arises to learn LINQ, the user may decide that investing time in learning LINQ may not be worthwhile because it is not located on the mobility service line 206. In some embodiments, prerequisite information may be stored along with the skill information. In such embodiments, stops may be ordered on a line in prerequisite order, thus allowing a user to see how far they are (i.e., how many stops away, or how many prerequisite skills are unattained) from obtaining a goal skill.

Though a static interface is illustrated in FIG. 2, one of ordinary skill in the art will recognize that, in some embodiments, the interface 200 may provide interactive features. For example, in some embodiments, clicking, tapping, or otherwise selecting a stop or a transfer station may present information regarding the related technologies, such as a description of the technology, a status of completed training related to the technology for the user, a list of available training resources for the technology, and/or the like. In some embodiments, a dynamic interface may allow a managerial user to quickly assess skills held by an employee (or skills collectively held by all employees in an organization or subdivision). For example, stops for which there are no employees having the related skills may be grayed out, while stops for which there are employees skilled in the related technologies may be displayed in color, in larger font or with larger circles, or using any other suitable technique.

Figure 3:
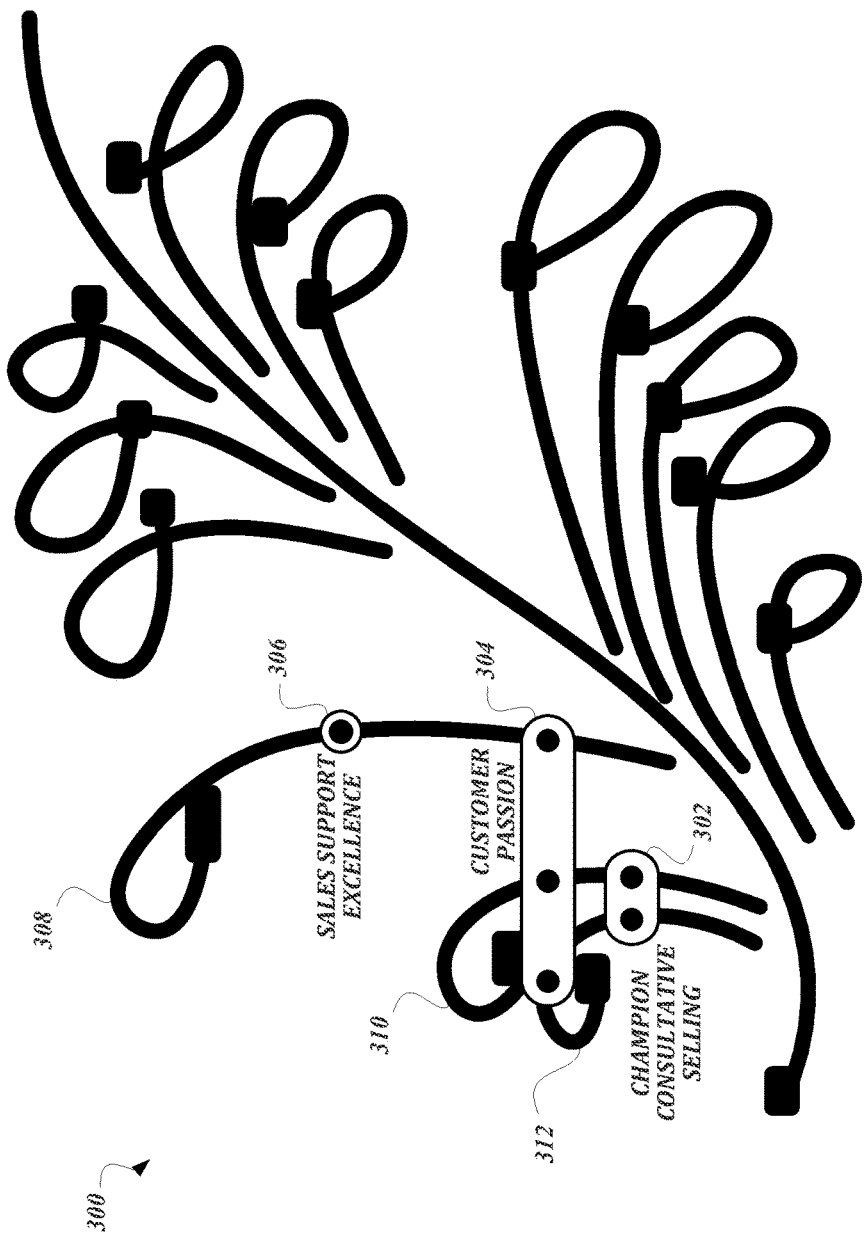
FIG. 3 is a detail view that illustrates another exemplary map presented by an embodiment of the present disclosure.

As stated above, FIGS. 2A and 2B illustrate an exemplary embodiment of an interface for managing technical skills in a format reminiscent of a transit map. In some embodiments, other formats or other types of skills may be used. FIG. 3 is a detail view that illustrates another exemplary map presented by an embodiment of the present disclosure. The interface 300 has a more organic shape than the interface 200 illustrated and discussed above, and therefore may be more suitable for managing non-technical skills such as skills important for a sales executive. The interface 300 still includes technology lines 308, 310, 312 similar to the technology lines described above, and links 302 and 304 between the technology lines. Line 308 includes a skill indication 306 that is not linked to one of the other lines. For the soft skills of sales support excellence 306, customer passion 304, and champion consultative selling 302, the system 100 may determine whether the skills are possessed by an employee by consulting a performance review system, and considering an employee to have the skill in response to determining that a score for a matching performance rating category is above a predetermined threshold.

Figure 4A:
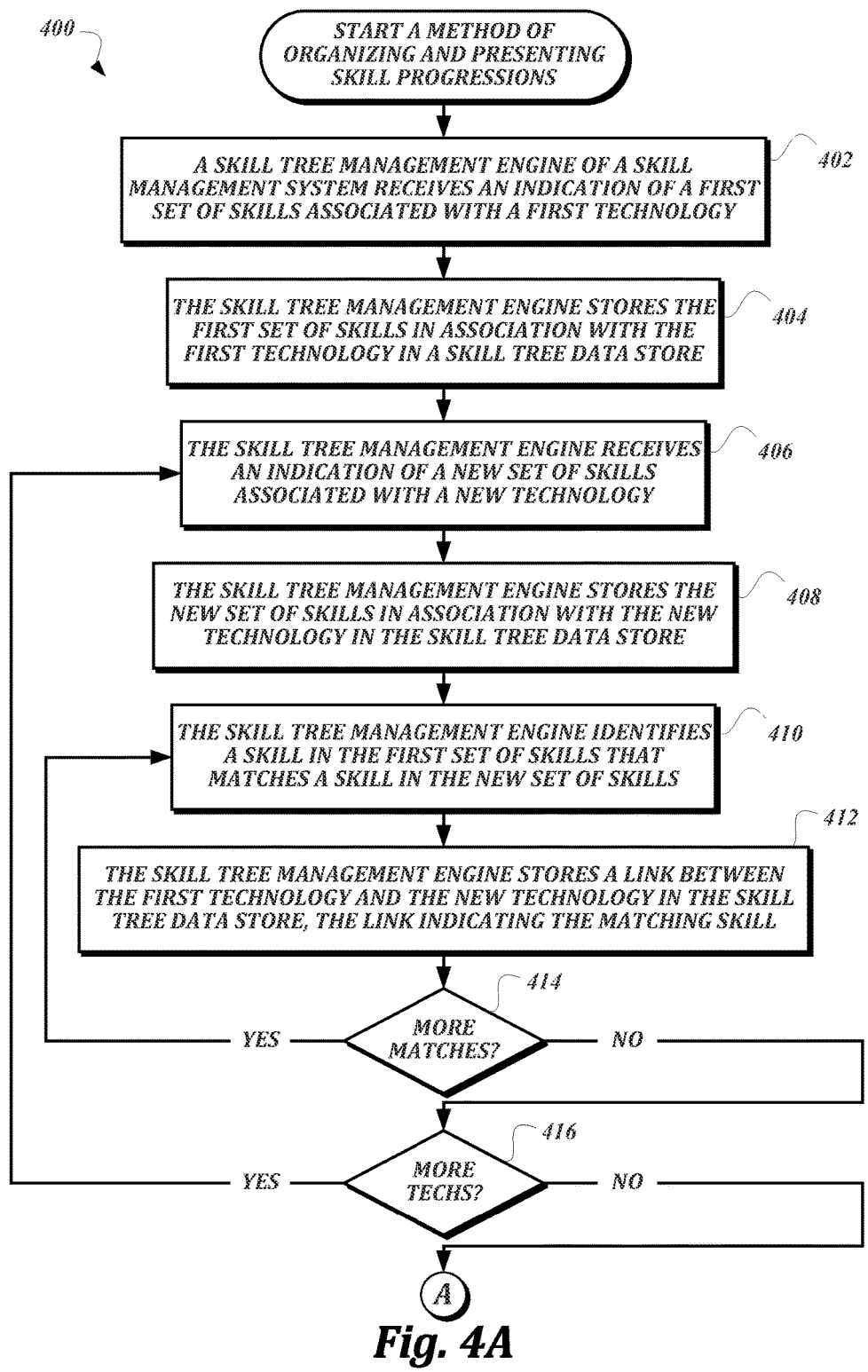
FIGS. 4A-4B are a flowchart that illustrates a method of organizing and presenting skill progressions according to various aspects of the present disclosure.
Figure 4B:
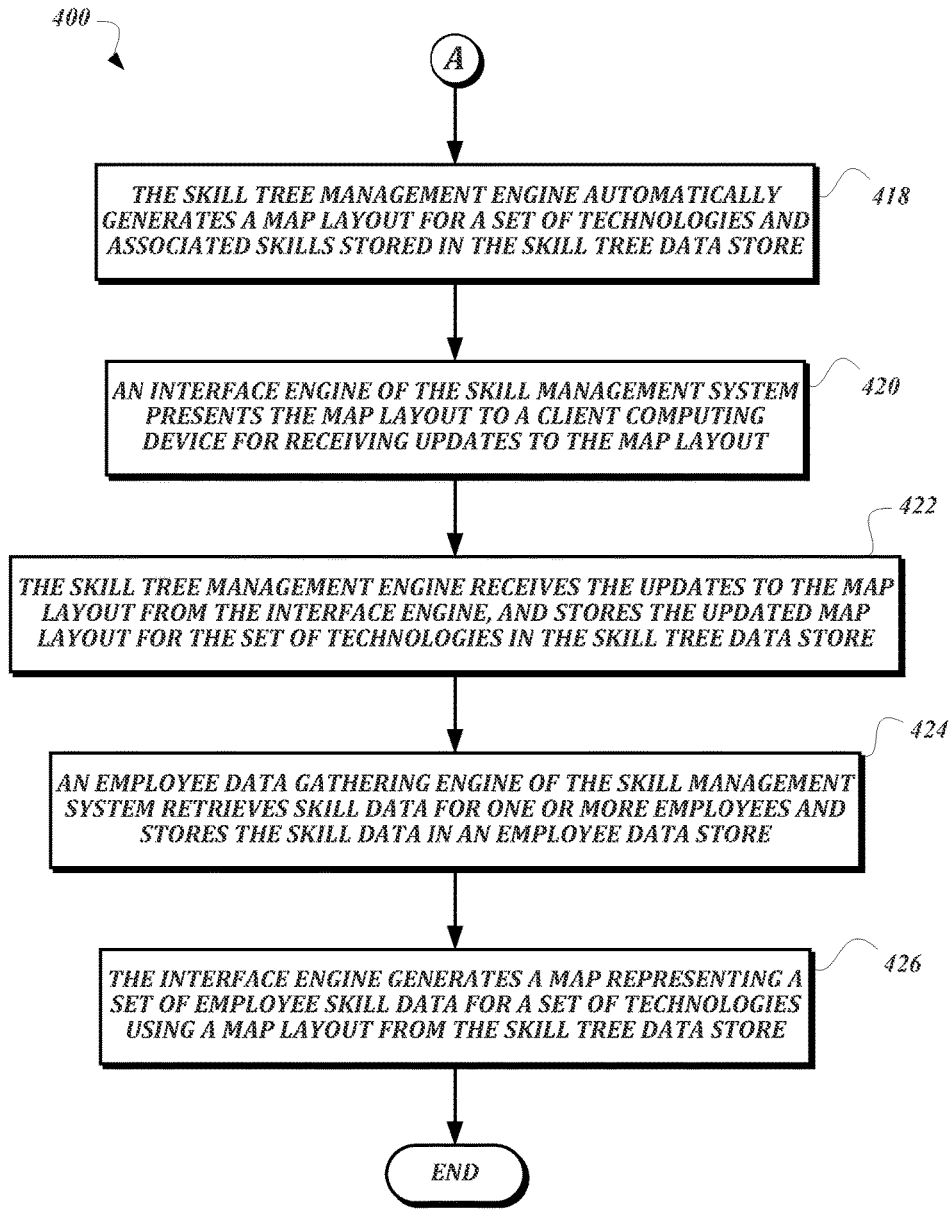

FIGS. 4A-4B are a flowchart that illustrates a method of organizing and presenting skill progressions according to various aspects of the present disclosure. From a start block (FIG. 4A), the method 400 proceeds to block 402, where a skill tree management engine 102 of a skill management system 100 receives an indication of a first set of skills associated with a first technology. In some embodiments, the indication of the first set of skills is received via the interface engine 110. For example, the interface engine 110 may generate an interface that prompts a user to enter a set of skills and a technology, and receives the entered set of skills and technology from the user. As another example, a user may provide a set of skills and the technology at once via a formatted text file, a spreadsheet, or via any other suitable data transfer format. In some embodiments, the indication of the first set of skills and the technology may be obtained by the skill tree management engine 102 by querying third-party data sources for skill definitions. In addition to the association between the skills and the technology, the indication may also provide further information about each of the skills and/or the technology, including but not limited to a description of the skill or technology, one or more prerequisite skills or technologies for a given skill or technology, resources for learning more about the skill or technology, and/or the like.

Next, at block 404, the skill tree management engine 102 stores the first set of skills in association with the first technology in a skill tree data store 106. The association may be stored in the skill tree data store 106 using any suitable format known to one of ordinary skill in the art that indicates that each skill of the first set of skills is associated with the first technology.

The method 100 then proceeds to block 406, where the skill tree management engine 102 receives an indication of a new set of skills associated with a new technology. At block 408, the skill tree management engine 102 stores the new set of skills in association with the new technology in the skill tree data store 106. As will be recognized by one of ordinary skill in the art, the actions described at blocks 406 and 408 for obtaining the indication of the new set of skills associated with the new technology are similar to the actions described at blocks 402 and 404 for obtaining the indication of the first set of skills associated with the first technology. In some embodiments, one or more of the skills in the first set of skills may match one or more skills in the new set of skills. For matching skills, additional copies of the skills may not be added to the skill tree data store 106 when storing the new set of skills in the skill tree data store 106, but instead an association may be added between the existing skill and the new technology.

Next, at block 410, the skill tree management engine 102 identifies a skill in the first set of skills that matches a skill in the new set of skills. At block 412, the skill tree management engine 102 stores a link between the first technology and the new technology in the skill tree data store 106, the link indicating the matching skill. In some embodiments, the link is stored by adding a record to the skill tree data store 106 that references the skill, the first technology, and the new technology. In some embodiments, such a link may not actually be stored, but instead may be dynamically generated when needed by querying the data store 106 for skills that are associated with more than one technology.

The method 400 then proceeds to a decision block 414, where a determination is made regarding whether there is another skill in the first set of skills that matches a skill in the new set of skills. If the result of the determination at block 414 is YES, then the method 400 returns to block 410. Otherwise, if the result of the determination at block 414 is NO, the method 400 proceeds to a decision block 416. At decision block 416, a determination is made regarding whether there is another technology to be added to the skill tree data store 106. If the result of the determination at block 416 is YES, then the method 400 returns to block 406. Otherwise, if the result of the determination at block 416 is NO, then the method 400 proceeds to a continuation terminal ("terminal A").

The steps above indicate that a plurality of technologies may be added to the skill tree data store 106. One of ordinary skill in the art will recognize that some technologies might not have any skills that match. Accordingly, the actions described at blocks 410 and 412 might not be performed for some technologies stored in the skill tree data store. One of ordinary skill in the art will also recognize that matches between skills associated with "a first technology" and "a new technology" are described for clarity. In some embodiments, matches could be found between skills associated with a new technology and any number of other technologies previously stored in the skill tree data store. 106.

From terminal A (FIG. 4B), the method 400 proceeds to block 418, where the skill tree management engine 102 automatically generates a map layout for a set of technologies and associated skills stored in the skill tree data store 106. In some embodiments, the map layout indicates the shape of lines representing each of the technologies of the set of technologies, locations of associated skills on each line, and locations of links between the lines. The set of technologies to be included in the map layout can be determined using any suitable technique. For example, in some embodiments, the set of technologies may be selected by user, while in some embodiments, all of the technologies stored in the skill tree data store 106 may be included in the set of technologies.

The initial shape of the lines and locations of the skills and links may be determined by any suitable technique. For example, in some embodiments, the skill tree management engine 102 may create a set of parallel lines to represent the technologies, sorted such that links between the lines do not overlap (or overlap a minimal amount). As another example, in some embodiments, an algorithm may be used to distribute the skill indication locations throughout the area of the map layout, and then the lines representing the technologies may be drawn to connect the associated skills. In embodiments for which prerequisite information is stored for the skills, the skill tree management engine 102 may organize the skills along the technology lines in order of prerequisites such that travel along a line would address the prerequisite skills in the required order.

The maps illustrated in FIGS. 2A, 2B, and 3 included lines, links, and skill indicators that included text labels for each element. In some embodiments, some text labels may be omitted, and the lines, links, and/or skill indicators may be identified using techniques other than text labels. For example, in some embodiments, technology lines may not include text labels, but instead may each be presented in a unique color or texture. In such embodiments, the map layout may include a legend that explains which color line is associated with which technology.

At block 420, an interface engine 110 of the skill management system 100 presents the map layout to a client computing device 114 for receiving updates to the map layout. In some embodiments, the updates may include instructions from a user to rearrange the skill indications within a technology line, to rearrange the lines or change their shape, or to rearrange links between the lines. As a nonlimiting example, the initial shape of the lines may be parallel lines of equal length, and the user may change the paths of the lines to look more aesthetically pleasing, such as illustrated in FIG. 2A, 2B, or 3. As another nonlimiting example, the user may remove skills or technology lines from the map layout to reduce visual clutter. As yet another nonlimiting example, the user may change colors, textures, patterns, or other attributes of the lines, skill indications, or links to improve aesthetics. As still another nonlimiting example, the user may add, remove, or change text labels associated with lines, skill indications, or links. At block 422, the skill tree management engine 102 receives the updates to the map layout from the interface engine 110, and stores the updated map layout for the set of technologies in the skill tree data store 106.

The method 400 then proceeds to block 424, where an employee data gathering engine 104 of the skill management system 100 retrieves skill data for one or more employees and stores the skill data in an employee data store 108. As discussed above, the skill data may be received by the employee data gathering engine 104 from user input, from third-party data sources such as the certification system 120, the capability assessment and management system (CAMS) 118, the training system 116, from a performance review system, or from any other suitable data source. The third party data stores may indicate trainings completed, tests passed, certifications obtained, and/or the like. In embodiments for which skill information stored by the skill tree data store 106 includes ways to prove that a skill is possessed by an individual, the employee data gathering engine 104 may use the information obtained from the third party data stores to infer skills held by a given employee. Some data stores, such as performance review systems, may include ratings of employees for certain skills. For example, a performance review system may rate a "customer service" skill for an employee on a scale of 1 to 5. The score may be directly stored in the employee data store 108, or the employee data gathering engine 104 may store an indication that the employee has the associated skill if a review score is greater than a predetermined threshold score.

At block 426, the interface engine 110 generates a map representing a set of employee skill data for a set of technologies using a map layout from the skill tree data store 106. In some embodiments, the interface engine 110 may generate a static image that includes a map based on the map layout, while in some embodiments, the interface engine 110 may generate an interactive image which may be zoomed, scrolled, rearranged, and/or the like. In some embodiments, the interface engine 110 may cause portions of the map to be emphasized to represent the employee skill data. The interface engine 110 may emphasize portions of the map, such as entire lines or individual skill indications or links between lines, based on whether the set of employee skill data indicates that a number of employees with the relevant skills to the portion being emphasized is greater than a predetermined threshold.

As a nonlimiting example and with reference to FIG. 2B, if there are at least five employees in the set of employees that have every skill on the mobility service line 206, the mobility service line 206 may be presented with emphasis (such as bolder, thicker, in a different color, etc.). As another example, the interface engine 110 can change the colors, brightnesses, shades, opacities, line weights, or any other attribute of the lines, skill indications, or links based on an indication that a threshold number of employees have the appropriate the skills. Such emphasis allows a manager of the organization to tell at a glance where technical strengths and weaknesses of the employees of the entire organization lie.

As another nonlimiting example and again with reference to FIG. 2B, the interface engine 1109 may generate a map that shows skill indications for a single employee. In such a map, skills that are not held by the employee may be de-emphasized, such as by being grayed out and/or the like. Such a map can help the employee determine where strengths and weaknesses in the employee's skill sets are. Moreover, the layout can help the employee plan to learn new skills for efficient career advancement. For example, FIG. 2B may indicate to an employee skilled in some of the mobility service line 206 technologies that learning .NET Framework 228 would help the employee branch into new areas of technical ability, because of the link illustrated between the mobility service line 206 and other lines in the map.

In some embodiments, an interactive map generated by the interface engine 110 may be configured to accept selections of a technology, a link, and/or a skill from a user, and then to retrieve the employee skill data associated with the selection from the employee data store 108 for presentation to the user. For example, if a user selected the Windows CE skill indicator 216, the interface engine 110 would query the employee data store 108 and present a list of employees that have the Windows CE skill. Such an interface can allow a manager to quickly review the skills of an organization, and to find employees skilled in particular areas in order to assign tasks (or for any other reason).

From block 426, the method 400 proceeds to an end block and terminates.

The embodiments discussed above primarily related to skills that are associated with technologies. In some embodiments, skills may also be grouped in other ways. In some embodiments, skills may be assigned to technologies, and also be assigned to one or more "axes." As a nonlimiting example, a given skill may be associated with one or more product technologies, and then may also be assigned to a "technical skill" axis, a "people skill" axis, or an "industry skill" axis. The axis specification may make it more convenient for a manager to generate map layouts for particular types of skills (e.g., generating a map layout for people skills across product technologies), or may allow the skill tree data store 106 to automatically generate map layouts that are organized by axis (e.g., technology lines associated with technical skills arranged in a first portion of the map layout or in a first direction, and technology lines associated with people skills arranged in a second portion of the map layout or in a second direct, so that they may be easily distinguishable).

Figure 5:
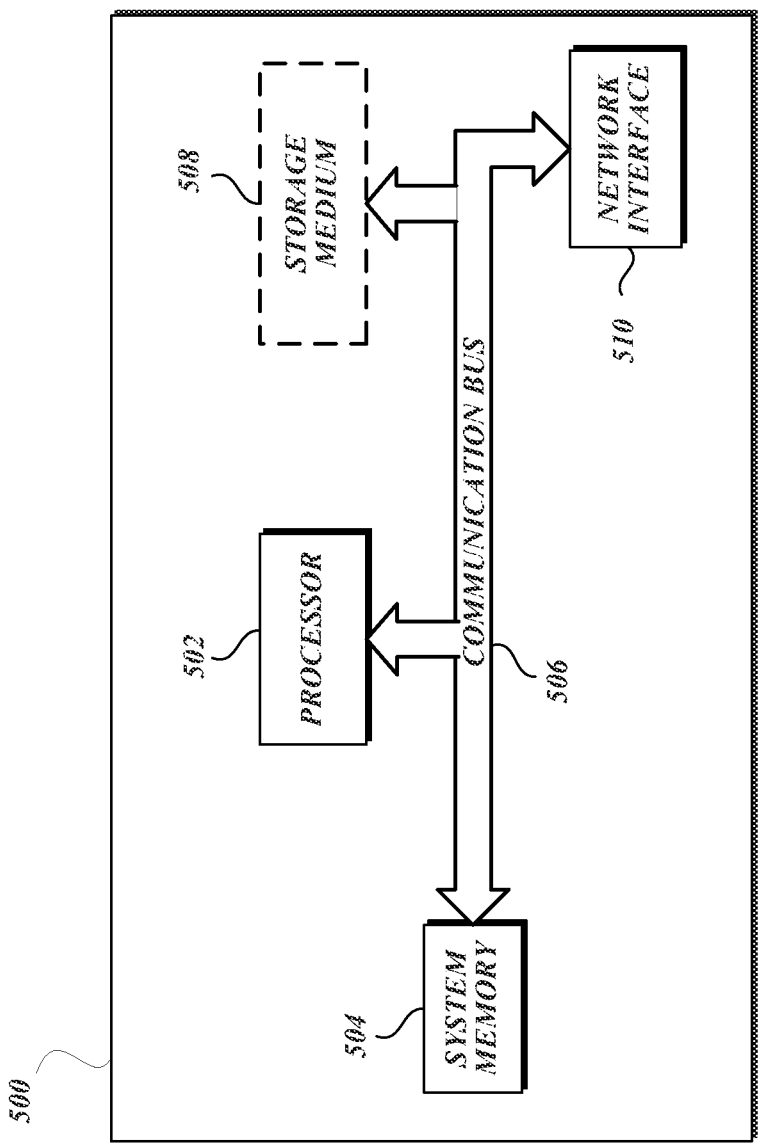
FIG. 5 is a block diagram that illustrates aspects of an exemplary computing device appropriate for use with embodiments of the present disclosure.

FIG. 5 is a block diagram that illustrates aspects of an exemplary computing device 500 appropriate for use with embodiments of the present disclosure. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, LTE, WiMAX, Bluetooth, and/or the like.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, USB, or other suitable connections protocols using wireless or physical connections. Similarly, the computing device 500 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

While one or more preferred embodiments of the disclosure have been illustrated and described, it will be appreciated that various changes can be made therein without departing from the spirit and scope of the claimed subject matter.

The embodiments of the invention in which an exclusive property or privilege is claimed are defined as follows:

1. A method, comprising:
   providing, by at least one computing device, a skill tree data store, wherein the skill tree data store is configured to store a set of technologies, and wherein each technology of the set of technologies includes a corresponding set of skills; and providing, by at least one computing device, an interface engine, wherein the interface engine is configured to generate an interface that includes a skill map; and providing, by at least one computing device, a skill tree management engine, wherein the skill tree management engine is configured to:
- receive a set of technologies, each technology of the set of technologies including a set of skills;
- generate a map layout based on the received set of technologies;
- store the map layout in the skill tree data store;
- receive user input from the interface engine indicating one or more updates to be applied to the map layout; and
- store an updated map layout in the skill tree data store;

wherein the skill map illustrates the set of technologies along with the corresponding skills using at least a first technology indicator associated with a first technology of the set of technologies and a second technology indicator associated with a second technology of the set of technologies; and wherein the skill map includes indications illustrating which skills are shared by more than one technology, wherein the indications include a first skill indicator associated with a first skill, and wherein the first skill indicator visually connects the first technology indicator and the second technology indicator within the skill map to illustrate that the first technology and the second technology are both associated with the first skill.

2. The method of claim 1, wherein generating the map layout includes:
- determining that a third technology and a fourth technology of the set of technologies both include a second skill; and
- adding a second skill indicator connecting a third technology indicator associated with the third technology and a fourth technology indicator associated with the fourth technology to the map layout, wherein the second skill indicator indicates the second skill.

3. The method of claim 1, further comprising providing, by at least one computing device, an employee data store, the employee data store configured to store a plurality of employee records, each employee record indicating a set of skills held by a given employee.

4. The method of claim 3, further comprising providing, by at least one computing device, an employee data gathering engine, the employee data gathering engine configured to:
- retrieve employee skill data for one or more employees from one or more third-party data sources; and
- store the retrieved employee skill data in the employee data store.

5. The method of claim 3, wherein the interface engine is further configured to generate an interface that includes a skill map that is altered based on employee skill data retrieved from the employee data store.

6. The method of claim 3, wherein the interface engine is further configured to receive a user selection of a technology or a skill, and to present employee data retrieved from the employee data store related to the selected technology or skill.

* * * * *